US008958305B2

(12) United States Patent
Sheth et al.

(10) Patent No.: US 8,958,305 B2
(45) Date of Patent: Feb. 17, 2015

(54) OSPF POINT-TO-MULTIPOINT OVER BROADCAST OR NBMA MODE

(75) Inventors: Nischal Sheth, Los Altos, CA (US); Zhaohui Zhang, Westford, MA (US); Lili Wang, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 394 days.

(21) Appl. No.: 12/609,837

(22) Filed: Oct. 30, 2009

(65) Prior Publication Data

US 2011/0103228 A1    May 5, 2011

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/751* | (2013.01) |

(52) U.S. Cl.
CPC ..................... *H04L 45/02* (2013.01)
USPC ........................................ 370/238

(58) Field of Classification Search
USPC ........................................ 370/238
See application file for complete search history.

(56) References Cited

U.S. PATENT DOCUMENTS

| | | | | |
|---|---|---|---|---|
| 5,995,503 | A * | 11/1999 | Crawley et al. | 370/351 |
| 6,820,134 | B1 * | 11/2004 | Zinin et al. | 709/238 |
| 7,023,804 | B1 * | 4/2006 | Younes et al. | 370/236 |
| 2002/0186652 | A1 * | 12/2002 | Popovich | 370/218 |
| 2003/0043820 | A1 | 3/2003 | Goringe et al. | |
| 2003/0081553 | A1 * | 5/2003 | Bitar | 370/236 |
| 2003/0123457 | A1 | 7/2003 | Koppol | |
| 2008/0037419 | A1 * | 2/2008 | Mirtorabi et al. | 370/228 |
| 2008/0240118 | A1 * | 10/2008 | Roy et al. | 370/400 |

OTHER PUBLICATIONS

European Search Report corresponding to EP 10 16 0863, mailed Aug. 4, 2010, 7 pages.
Moy, "OSPF Version 2", Network Working Group, RFC-2328, Apr. 1998, 244 pages.
Coltun et al., "OSPF for IPv6", Network Working Group, RFC-5340, Jul. 2008, 94 pages.

* cited by examiner

*Primary Examiner* — Jason Mattis
*Assistant Examiner* — Adnan Baig
(74) *Attorney, Agent, or Firm* — Harrity & Harrity, LLP

(57) ABSTRACT

A network device identifies an Open Shortest Path First (OSPF) link between the network device and a layer 2 network as one of a point-to-multipoint over broadcast interface or a point-to-multipoint over non-broadcast multi access (NBMA) interface, and performs database synchronization and neighbor discovery and maintenance using one of a broadcast model or a NBMA model. The network device also generates a link-state advertisement for the network device, where the link-state advertisement includes a separate link description for each point-to-point link within the layer 2 network; and sends the link-state advertisement to each fully adjacent neighbor in the layer 2 network.

20 Claims, 7 Drawing Sheets

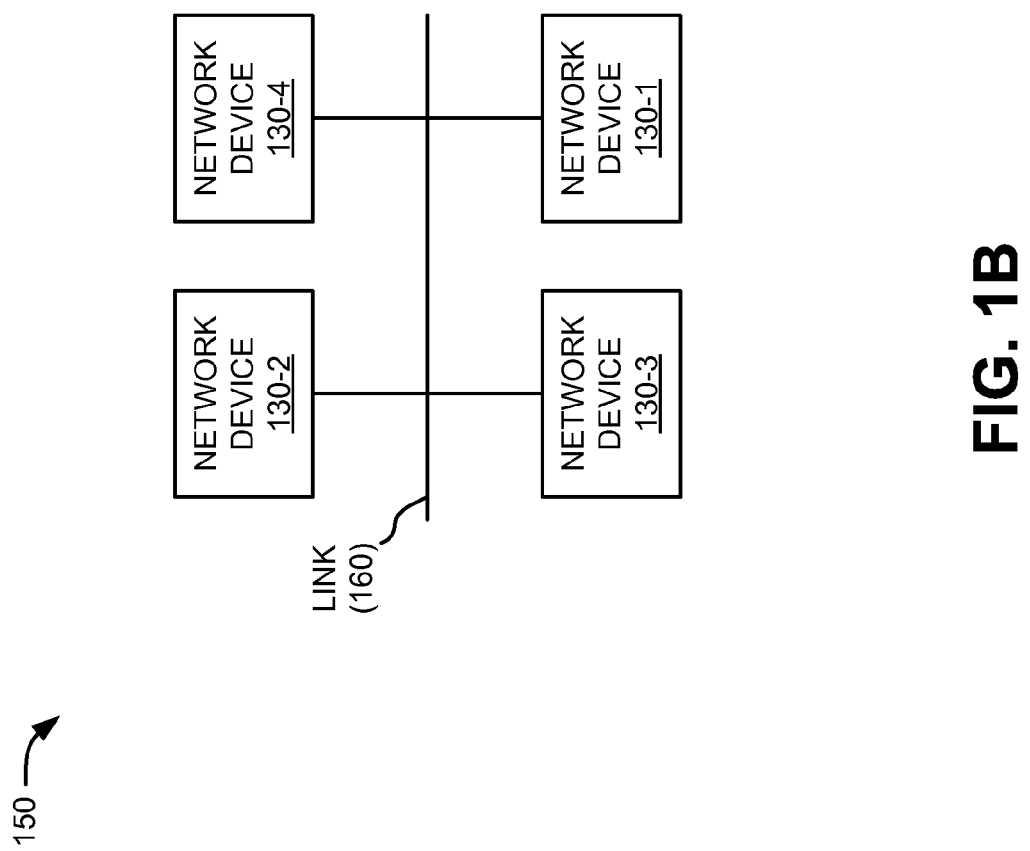

OSPF POINT-TO-MULTIPOINT OVER BROADCAST OR NBMA MODE

BACKGROUND

Open Shortest Path First (OSPF) is a routing protocol developed for Internet Protocol (IP) networks that calls for the distribution of link-state advertisements (LSAs) among other routers. Information on attached interfaces, metrics used, and other variables may be included in OSPF LSAs. As OSPF routers accumulate link-state information, they use algorithms that calculate the shortest path to various routers (network nodes). A link-state database that provides an overall picture of networks in relationship to routers may be constructed from the collection of LSAs received from all routers in the same area. Because routers within the same area share the same information, they may have identical link-state databases.

OSPF uses hello protocol in some instances of OSPF operations. When a router using the OSPF protocol is powered up, it initializes its routing-protocol data structures and then waits for indications from lower-layer protocols that its interfaces are functional. After a router is assured that its interfaces are functioning, it uses the OSPF Hello protocol to acquire neighbors (e.g., routers with interfaces to a common link). The router sends hello packets to its neighbors and receives their hello packets. In addition to helping acquire neighbors, hello packets also act as "keepalive" messages that let routers know that other routers are still functional. On some multi-access networks (e.g., networks supporting more than two routers), the Hello protocol elects a designated router ("DR") and a backup designated router ("BDR"). Among other things, the designated router is responsible for generating LSAs for the entire multi-access network. Designated routers allow a reduction in network traffic and in the size of the link-state database.

Link-state databases may be exchanged when two OSPF nodes (e.g., routers and/or other network devices) are trying to establish a full adjacency. To achieve full adjacency between the OSPF nodes, the link-state databases are synchronized through a database exchange procedure. A first node sends a second node a summary of a link-state database of the first node through a set of database description packets that contain a header of every link-state advertisement (LSA) in the link-state database of the first node. For every received LSA header that is contained in the database description packets, the second node compares the LSA header with a corresponding LSA instance in a link-state database of the second node. The second node sends the first node a request for the LSA if the LSA instance in the database of the second node is older or not present. Similarly, the second node sends the first node a summary of a link-state database of the second node through a set of database description packets that contain a header of every LSA in the link-state database of the second node. For every received LSA header that is contained in the database description packets, the first node compares the LSA header with a corresponding LSA instance in the link-state database of the first node. The first node sends the second node a request for the LSA if the LSA instance in the database of the first node is older or not present.

An adjacency becomes full from the point of view of the first node when the first node finishes sending the summary of the link-state database of the first node and processing all the database description packets from the second node, and gets all the LSAs from the second node that the first node has requested. An adjacency becomes full from the point of view of the second node when the second node finishes sending the summary of the link-state database of the second node and processing all the database description packets from the first node, and gets all the LSAs from the first node that the second node has requested. A full adjacency between the first node and the second node is formed successfully when an adjacency becomes full from the point of view of both the first node and the second node.

In OSPF, a reliable flooding mechanism is used to ensure that link-state databases remain synchronized. When a router generates or modifies an LSA, it must communicate this change throughout the network. The router starts the synchronization process by forwarding the LSA to each fully adjacent router. LSAs received at one router may be stored and forwarded to adjacent routers until all routers in an area have received the LSA.

Certain layer 2 networks (defined, e.g., in the Open System Interconnect (OSI) network model) may allow any-to-any communication between all nodes in the layer 2 network, with different costs associated with communication between any given pair of nodes. Costs may be expressed as simple numbers and may include such factors as distance between nodes (round-trip time), network throughput of a link, or link availability and reliability. When running the OSPF routing protocol on these layer 2 networks, the network may be modeled as a broadcast link, which requires a node on the network to have full adjacency with only one or two nodes of the network (e.g., a DR and a BDR for the layer 2 network). DRs and BDRs may also be utilized on NBMA (non-broadcast multi access) networks. However, the representation of broadcast links or NBMA links in OSPF assumes that a given node can reach all other nodes on the link with identical cost/metrics. To advertise a different cost to each of the nodes on a link, full adjacency between nodes is required. However, having each node maintain full adjacency with each of the other nodes in the layer 2 network can overburden some networks, such as low bandwidth radio networks.

SUMMARY

According to one aspect, a network device may include a memory to store instructions and an Open Shortest Path First (OSPF) link-state database, and a processor to execute instructions in the memory to: identify an OSPF protocol link between the network device and a layer 2 network as a point-to-multipoint over broadcast interface or a point-to-multipoint over NBMA interface; perform database synchronization and neighbor discovery and maintenance using a broadcast model or a NBMA model; classify the link as a point-to-multipoint link for representation in the OSPF link-state database; generate a link-state advertisement for the network device, where the link-state advertisement includes a separate point-to-point link description for every neighbor within the layer 2 network; and send the link-state advertisement to each fully adjacent neighbor device in the layer 2 network.

According to another aspect, a network-device-implemented method is provided. The method may include identifying, by the network device, an Open Shortest Path First (OSPF) link between the network device and a layer 2 network as a point-to-multipoint over broadcast interface or a point-to-multipoint over NBMA interface; performing database synchronization and neighbor discovery and maintenance using a broadcast model or a NBMA model; representing, by the network device, the link between the network device and the layer 2 network as a point-to-multipoint link for representation in an OSPF link-state database; generating, by the network device, a link-state advertisement for the network device, where the link-state advertisement includes a separate link description for each point-to-point link between the network device and multiple neighbor network devices within the layer 2 network; and sending, by the network device, the link-state advertisement to each fully adjacent neighbor network device in the layer 2 network.

In still another aspect, a network device may include means for identifying an OSPF link between the network device and a layer 2 network as one of a point-to-multipoint over broadcast interface or a point-to-point over NBMA interface; means for performing database synchronization and neighbor discovery and maintenance using a broadcast model or a NBMA model; means for building a link-state advertisement for the network device, where the link-state advertisement includes a separately assigned link metric value for each point-to-point link; means for sending the link-state advertisement to each fully adjacent neighbor in the layer 2 network; and means for re-calculating routes through the layer 2 network based on the information in the link-state advertisement.

According to a further aspect, a method may be performed by a network device in a layer 2 network of multiple neighboring network devices. The method may include conducting neighbor discovery over an OSPF link within the layer 2 network; and sending, via the OSPF link within the layer 2 network, one or more link-state advertisements, where the one or more link-state advertisements includes a different metric for each OSPF point-to-point link between the network device and one of the multiple neighboring network devices.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 1A and 1B are diagrams of an exemplary environment in which systems and/or methods, described herein, may be implemented;

DETAILED DESCRIPTION

The following detailed description refers to the accompanying drawings. The same reference numbers in different drawings may identify the same or similar elements. Also, the following detailed description does not limit the invention.

Implementations described herein may provide systems and/or methods that efficiently represent a layer 2 network in OSPF protocol by modeling each link in the network as a point-to-multipoint-over-broadcast-or-NBMA ("P2MP-over-broadcast-or-NBMA") link. Using the P2MP-over-broadcast-or-NBMA model, a network device (e.g., a router or another node) may treat the network as a broadcast or NBMA network link to conduct neighbor discovery/maintenance (e.g., hello messages, etc.) and database synchronization (e.g., LSA flooding). The link may be represented in an OSPF link-state database as a point-to-multipoint (P2MP) link, allowing network devices to advertise (e.g., via LSA flooding) a different cost/metric for each link to a neighboring network device. Thus, systems and/or methods described herein may provide the network bandwidth efficiency of an OSPF broadcast or NBMA network interface while advertising unique costs/metrics associated with individual point-to-point links.

Exemplary Network

Figure 1A:
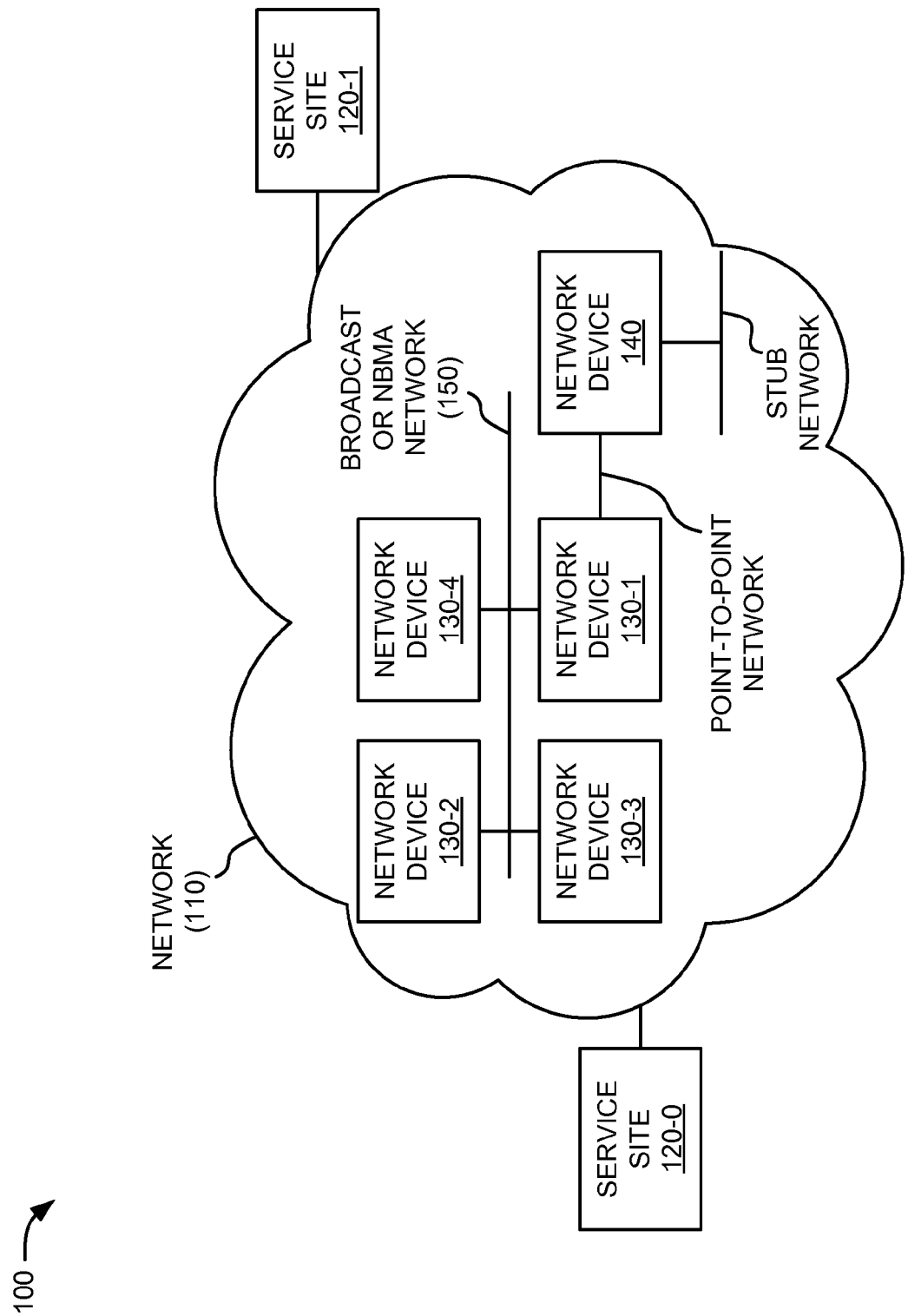

FIGS. 1A and 1B provide diagrams of an exemplary environment 100 in which systems and methods described herein may be implemented. FIG. 1A provides an overview of the environment, and FIG. 1B depicts an exemplary arrangement of components within a broadcast or NBMA network within network 110 of FIG. 1A. As illustrated in FIG. 1A, environment 100 may include network 110 connecting one or more service sites 120-0 and 120-1 (collectively referred to as "service sites 120" and singularly as "service site 120"). Network 110 may include one or more network devices 130-1, 130-2, 130-3, and 130-4 (collectively referred to as "network devices 130" and singularly as "network device 130"), and network device 140. Network device 140 may be similar to network devices 130, but is numbered differently for clarity. Components of environment 100 may interconnect via wired and/or wireless connections or links.

For simplicity, one network 110 two service sites 120, and five network devices 130/140, have been illustrated in FIG. 1A. In practice there may be more or fewer networks 110, service sites 120, and/or network devices 130/140. In addition, other components that facilitate communications between the various entities illustrated in FIG. 1A may also be included in environment 100. Further, in some instances, one or more of the components of environment 100 may perform one or more functions described as being performed by another one or more of the components of environment 100.

Network 110 may include one or more layer 2 networks, such as a local area network (LAN) or a private network (e.g., a company network or intranet). In one implementation, network 110 may be included within an autonomous system (AS) or data network that has a collection of connected routing prefixes under the control of one or more network operators that operate under a unique autonomous system number (ASN). Network 110 may include a variety of network devices 130/140 and network types defined, for example, under OSPF protocols, such as point-to-point, broadcast, NBMA, P2MP, and/or stub networks. Exemplary networks illustrated in FIG. 1 include broadcast or NBMA network 150, a point-to-point network, and a stub network.

Service site 120 may include one or more server devices, or other types of computation or communication devices, that gather, process, search, and/or provide information in a manner described herein. In one implementation, service site 120 may correspond to one or more devices of a customer that receives services provided by a service provider of network 110 (e.g., via network devices 130). For example, service site 120-0 may correspond to a computer provided in a customer's home, service site 120-1 may correspond to the Internet, and the service provider may correspond to an Internet service provider that provides the customer (e.g., service site 120-0) access to the Internet (e.g., service site 120-1) via network devices 130/140.

Network device 130/140 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. Network devices 130/140 may also be referred to generally as "nodes." Network devices 130/140 may forward unicast data (e.g., data over a point-to-point or NBMA link) and multicast data to other devices in network 110, such as other network devices 130/140 and/or service sites 120.

Neighboring network devices 130/140 within network 110 may be connected by various types of links, which may be modeled as different OSPF interface types, such as broadcast, NBMA, point-to-point, P2MP, etc. FIG. 1B provides an illustration of broadcast or NBMA network 150 showing a particular multi-access link that may be implemented within network 110. Referring to FIG. 1B, in implementations herein, each of network devices 130-1, 130-2, 130-3, and 130-4 may be modeled using a single multi-access link 160. Link 160 may be modeled as one of two new OSPF interface types called P2MP-over-broadcast or P2MP-over-NBMA (herein referred to collectively as "P2MP-over-broadcast-or-NBMA" or "point-to-multipoint over broadcast or NBMA"). For simplicity, only four network devices 130 using link 160 are shown in network 150. In other implementations, more or few network devices 130 may be used with link 160.

In operation, network devices 130 within network 150 may apply OSPF protocols to route information (e.g., IP packets) and provide services between, for example, service site 120-0 and service site 120-1. In an exemplary implementation, network devices 130 may apply OSPF protocols to identify an optimal path for network traffic through a network (e.g., network 110). Network devices 130 may exchange link-state information to facilitate the flow of network traffic.

To provide optimal routing, network devices 130 may account for different costs (reflecting, for example, distance between network devices, network throughput of a link, link availability/reliability, and/or other factors) associated with each network link. However, among the network devices 130 there exists n*(n−1)/2 neighbor relationships. Thus, assuming n=4 in the example of FIG. 1B, there may be six neighbor relationships (or links) among network devices 130-1, 130-2, 130-3, and 130-4. Maintaining full adjacency to monitor different costs associated with each network link among all the network devices 130 within network 150 may overburden network 150.

In implementations of the P2MP-over-broadcast-or-NBMA model described herein, OSPF network link 160 may be used to provide LSAs with the different costs associated with point-to-point links among all the network devices 130 within network 150. The network devices 130 within network 150 may be represented as a P2MP link in the OSPF link-state database. This means that there may be one link per neighbor in the LSA of each network device 130, thus allowing each network device 130 to advertise a different metric/cost to each neighbor and accurately representing the underlying cost of communication in network 150. Also, in implementations described herein, flooding and database synchronization actions may be accomplished efficiently through use of a designated network device (e.g., a designated router (DR) and/or a backup designated router (BDR)) selected from the network devices 130 within network 150. Furthermore, where network 150 is a broadcast network, automatic discovery may be conducted using a multicast address without needing configuration with respect to the identity of the rest of the OSPF network devices associated with network 150.

Exemplary Network Device Configuration

Figure 2:
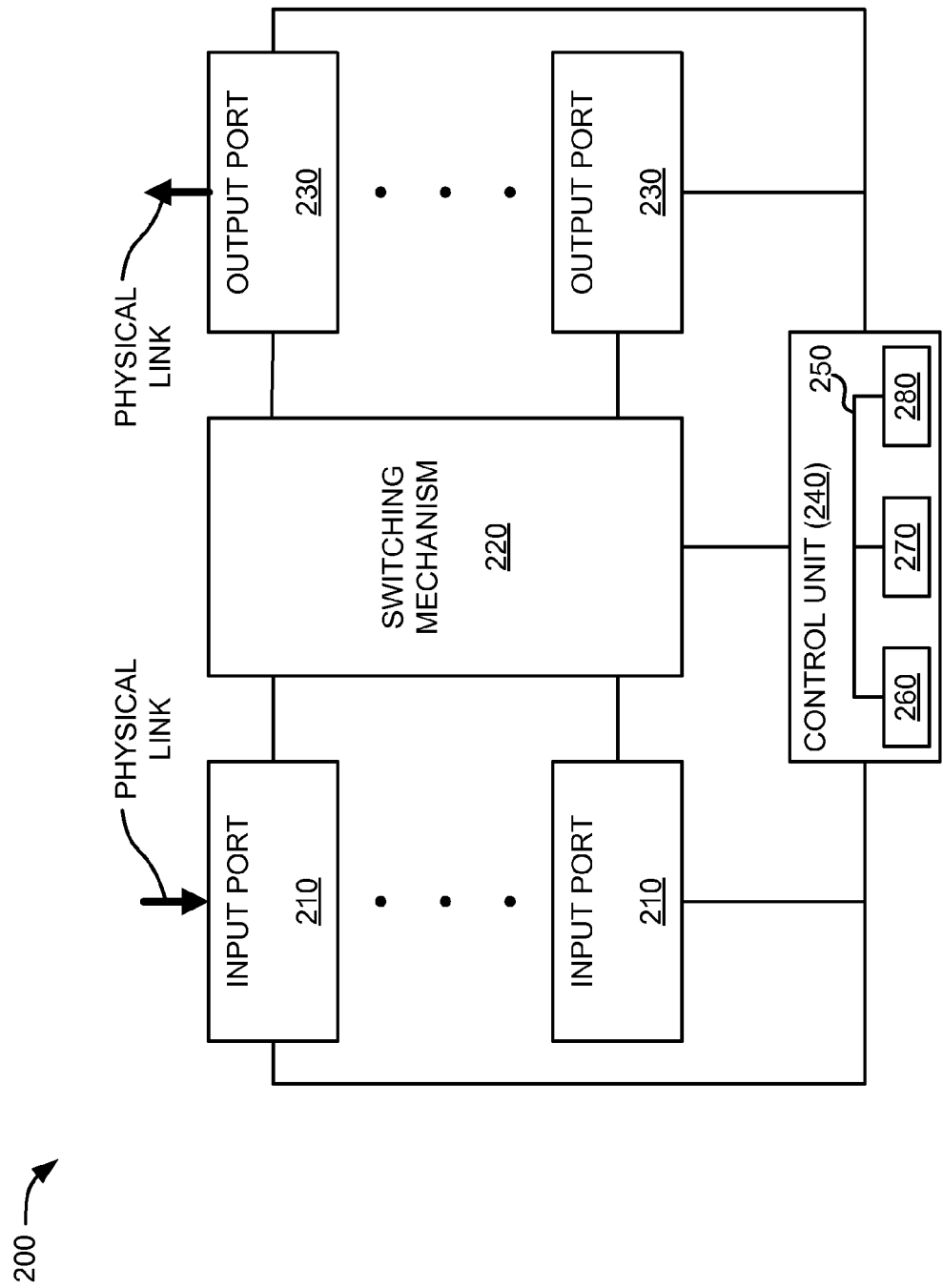
FIG. 2 is a block diagram illustrating exemplary components of a network device of FIGS. 1A and/or 1B.

FIG. 2 illustrates a diagram of exemplary components of a device 200 that may correspond to one of network devices 130/140 depicted in FIGS. 1A and/or 1B. As shown, device 200 may include input ports 210, a switching mechanism 220, output ports 230, and a control unit 240.

Input ports 210 may be the point of attachment for a physical link and may be the point of entry for incoming traffic. Input ports 210 may perform data link layer encapsulation and decapsulation. Input ports 210 may look up a destination address of incoming traffic in a forwarding table to determine its destination port (i.e., route lookup). In other implementations, input ports 210 may send (e.g., may be an exit point) and/or receive (e.g., may be an entry point) traffic.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store traffic and may schedule traffic for service on an output link (e.g., a physical link). Output ports 230 may include scheduling algorithms that support priorities and guarantees. Output ports 230 may support data link layer encapsulation and decapsulation, and/or a variety of higher-level protocols. In other implementations, output ports 230 may send traffic (e.g., may be an exit point) and/or receive traffic (e.g., may be an entry point).

Control unit 240 may use routing protocols and one or more forwarding tables for forwarding traffic. Control unit 240 may interconnect with input ports 210, switching mechanism 220, and output ports 230. Control unit 240 may compute a forwarding table, construct a link-state database (LSDB), implement routing protocols, and/or run software to configure and manage device 200. Control unit 240 may handle any traffic whose destination address may not be found in the forwarding table. In some implementations, control unit 240 may communicate with an external network management system or operation support system and may perform provisioning, configuration, reporting, and/or maintenance functions for network device 130.

In one implementation, control unit 240 may include a bus 250 that may include a path that permits communication among a processor 260, a memory 270, and a communication interface 280. Processor 260 may include one or more processors, microprocessors, or other types of processing units, such as application-specific integrated circuits (ASICs), field-programmable gate arrays (FPGAs), etc., that may interpret and execute instructions. Memory 270 may include a random access memory (RAM), a read only memory (ROM) device, a magnetic and/or optical recording medium and its corresponding drive, and/or another type of static and/or dynamic storage device that may store information and/or instructions for execution by processor 260. For example, memory 270 may include LSDB, routing tables, etc. Communication interface 280 may include any transceiver-like mechanism that enables control unit 240 to communicate with other devices and/or systems.

Device 200 may perform certain operations to implement an OSPF P2MP-over-broadcast-or-NBMA mode, as described in detail below. Device 200 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Exemplary Network Interactions

Figure 3A:
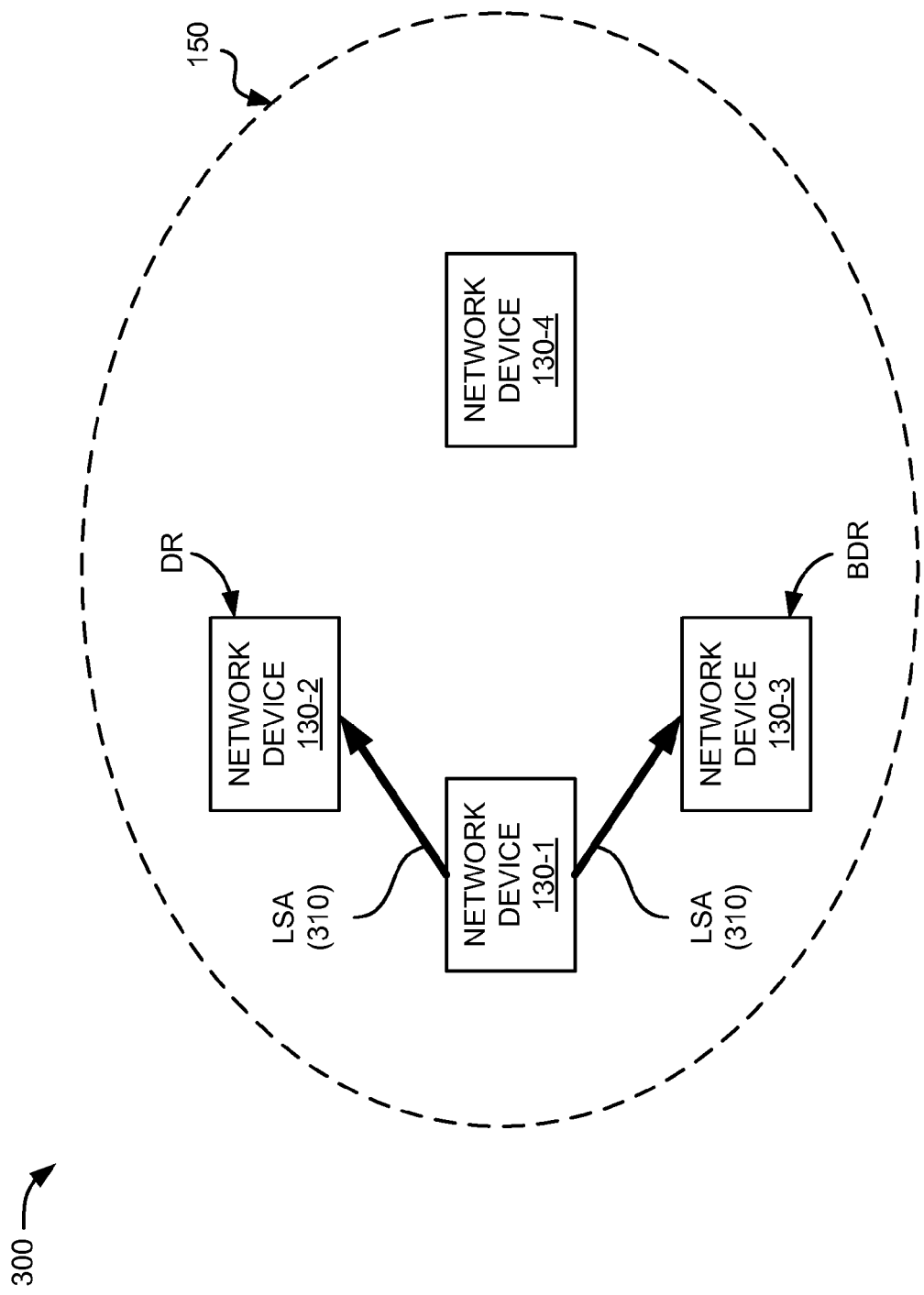
FIGS. 3A and 3B illustrate diagrams of exemplary interactions among components of an exemplary portion of the network device depicted in FIG. 1B.
Figure 3B:
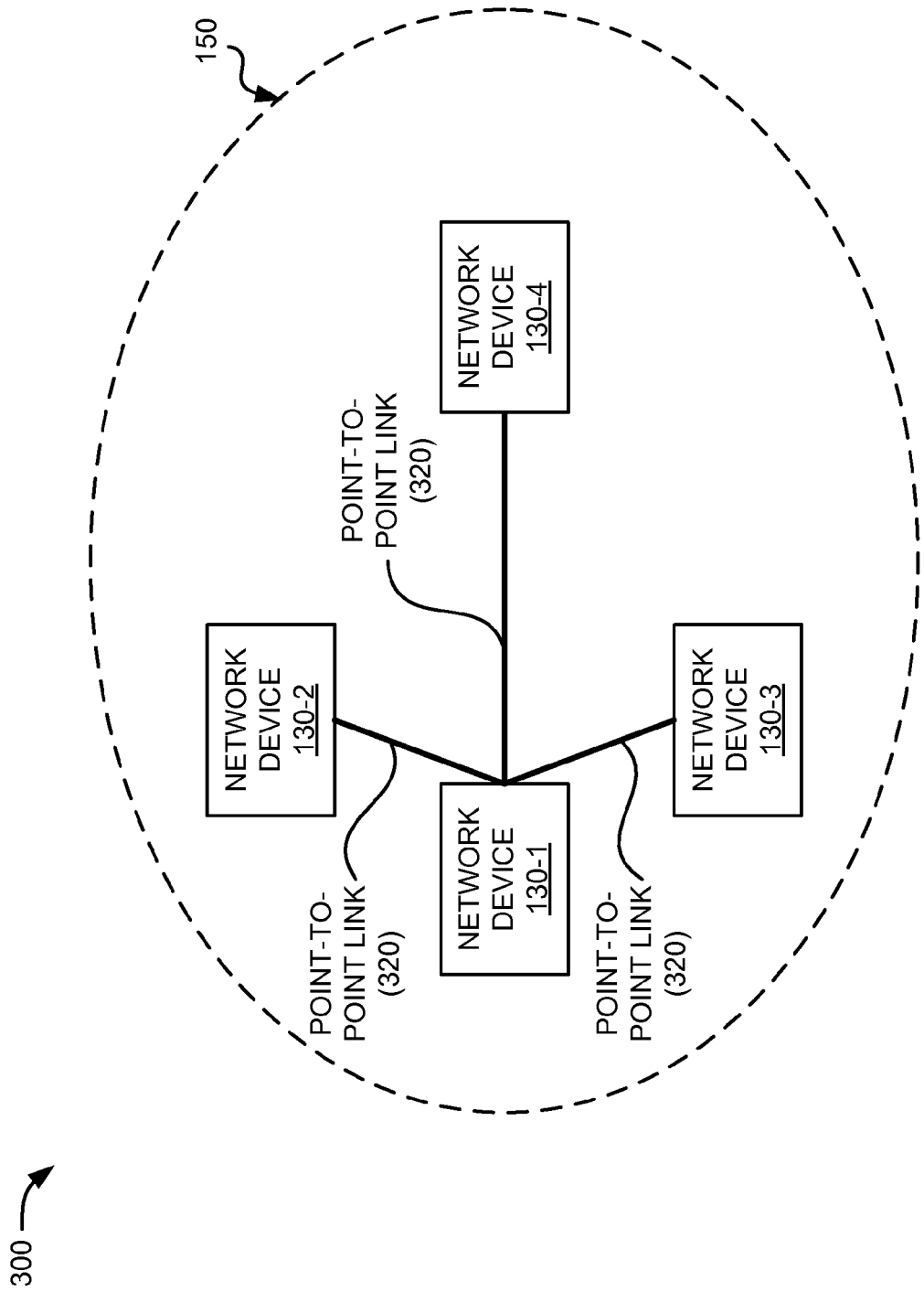

FIGS. 3A and 3B illustrate exemplary interactions among components of an exemplary portion 300 of the network 150 depicted in FIG. 1B. More particularly, FIG. 3A illustrates a broadcast/NBMA link model for use with neighbor discovery/maintenance and database synchronization messages according to implementations described herein. As illustrated, exemplary portion 300 may include network devices 130-1, 130-2, 130-3, and 130-4. Each network device 130 may include the features described above in connection with, for example, FIGS. 1A, 1B, and 2.

In the configuration of FIG. 3A, network devices 130-1, 130-2, 130-3, and 130-4 may be modeled using a single P2MP-over-broadcast-or-NBMA link. For example, a network administrator may assign a P2MP-over-broadcast or a P2MP-over-NBMA configuration via an OSPF command line interface. The P2MP-over-broadcast or P2MP-over-NBMA interface types may be interpreted by OSPF code within network devices 130 as an indication to use broadcast or NBMA network procedures for neighbor discovery and maintenance and database synchronization, but to represent the interface as P2MP in the link-state database for network 150.

Network devices 130-1, 130-2, 130-3, and 130-4 may be configured within a network (e.g., network 150) that includes a designated router (DR) and a backup designated router (BDR). The DR and BDR may serve as central points for database synchronization (e.g., LSA flooding). In an exemplary implementation, network devices 130 (e.g., any of network devices 130-1, 130-2, 130-3, and 130-4) may send an update (e.g., flooding an LSA) to any network devices 130 with full adjacency. In one implementation, where the sending network device (e.g., network device 130-1) is not the DR or BDR, the sending network device may send updates only to the DR and BDR. In another implementation, where the sending network device (e.g., network device 130-2) is the DR, the sending network device may send the update to multiple other network devices 130 in network 150. Use of the DR and BDR may allow network devices 130 in network 150 to maintain fewer full adjacencies, thus reducing network traffic.

In the configuration of FIG. 3A, assume that network device 130-2 includes the DR and that network device 130-3 includes the BDR for network 150 that includes network devices 130-1, 130-2, 130-3, and 130-4. While the DR and BDR designations are shown associated with individual network devices, in other implementations, a network device 130 may have multiple designations. For example, a given physical network device 130 may have some interfaces that serve as a DR, other interfaces that server as a BDR, and other interfaces that are non-designated.

Using the P2MP-over-broadcast-or-NBMA model, OSPF communications relating to database synchronization from network device 130-1 may be modeled as a broadcast or NBMA link, such that network device 130-1 may only have to maintain full adjacency with DR network device 130-2 and BDR network device 130-3. For example, when conducting database synchronization in a broadcast network environment, network device 130-1 may send an LSA 310 to the known address for "All Designated Routers." Thus, LSA 310 from network device 130-1 may be directed to DR network device 130-2 and BDR network device 130-3.

FIG. 3B illustrates a point-to-multipoint link model from the perspective of a single network device (e.g., network device 130-1) implementing a P2MP-over-broadcast-or-NBMA interface according to implementations described herein. Referring to FIG. 3B, a P2MP-over broadcast-or-NBMA interface between network device 130-1 and the other network device in network 150 may be represented as multiple point-to-point links 320 in the LSA for each network device 130. Thus, network device 130-1 may have a topological representation of each other network device 130 in network 150 (e.g., network devices 130-2, 130-3, and 130-4) and may advertise connectivity to each of network devices 130-2, 130-3, and 130-4 individually.

Although FIGS. 3A and 3B show exemplary components of network portion 300, in other implementations, network portion 300 may contain fewer, different, differently arranged, or additional components than depicted in FIG. 3. In still other implementations, one or more components of network portion 300 may perform one or more other tasks described as being performed by one or more other components of network portion 300.

Exemplary LSA Structure

Figure 4:
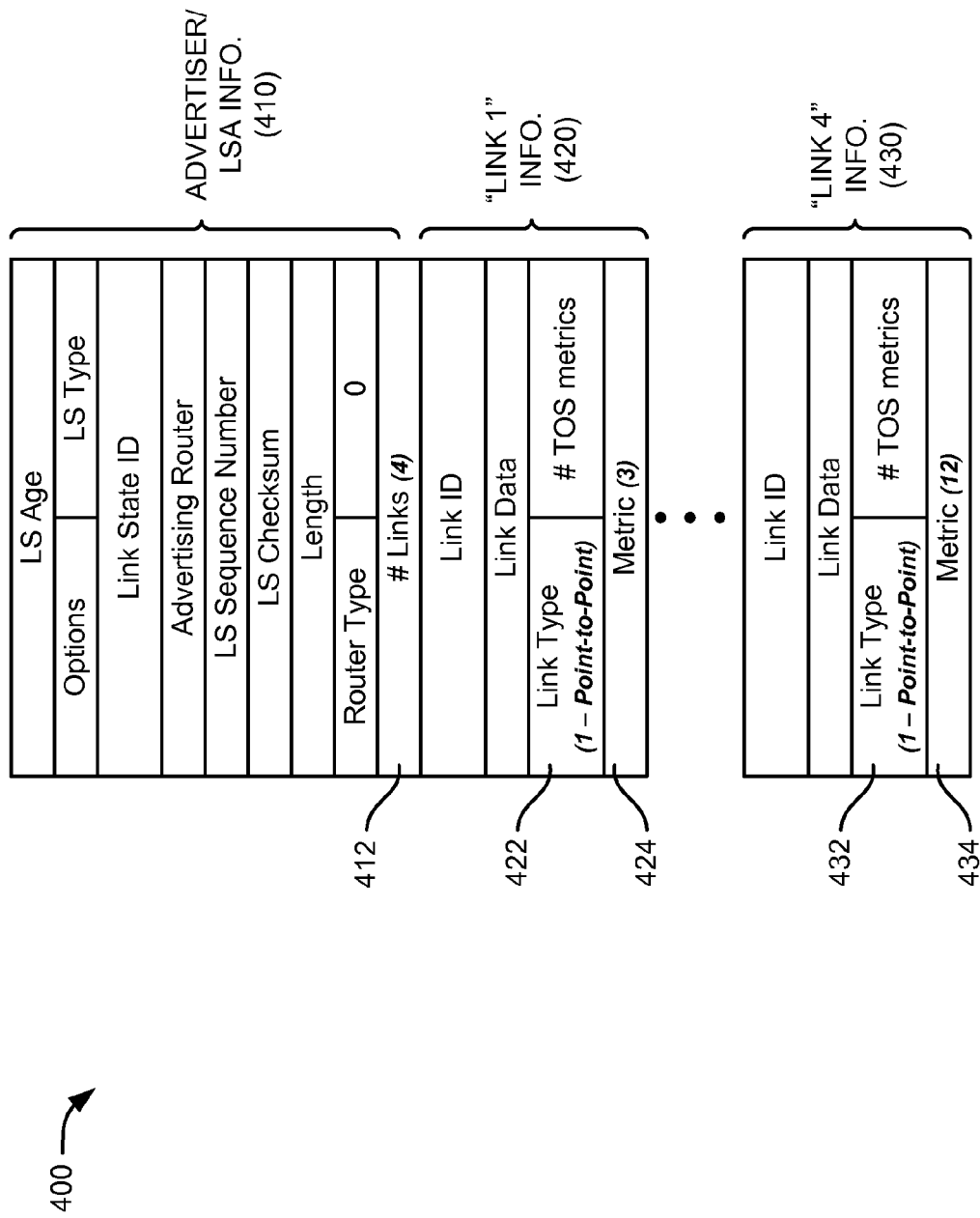
FIG. 4 illustrates an exemplary link-state advertisement (LSA) structure for implementing a point-to-multipoint-over-broadcast-or-NBMA link according to implementations described herein.

FIG. 4 illustrates an exemplary LSA structure 400 for implementing a P2MP-over-broadcast-or-NBMA link according to implementations described herein. In one implementation, LSA structure 400 may be built by network device 130-1 when configured as shown in FIG. 2. LSA structure 400 may include advertiser/LSA information 410 and link information 420 and 430. Advertiser/LSA information 410 may include standard field(s) to identify, for example, the originating network device and the particular LSA.

When a link within a network (e.g., network 150) is modeled as P2MP-over-broadcast-or-NBMA link, the area link may be represented as a P2MP link in the OSPF LSDB. The P2MP link may then be represented as multiple point-to-point links in each network device LSA. Thus, as seen in FIG. 4, LSA structure 400 for network device 130-1 of FIG. 3 may include a number of links ("# Links") field 412 indicating four links are being reported (e.g., corresponding the point-to-point links 320 of FIG. 3B). Only two (e.g., "link 1" information 420 and "link 4" information 430) of the four reported links are shown in FIG. 4 for simplicity.

Each of "link 1" information 420 and "link 4" information 430 may include a link type field 422 and 432, respectively, to indicate the type of link being reported. In implementations herein, each link may be reported (e.g., with the appropriate numerical identifier) as a point-to-point connection to a neighboring network device. Each of "link 1" information 420 and "link 4" information 430 may include a metric field 424 and 434, respectively. Metric fields 424 and 434 may include a numerical value (e.g., from 1 to 65,535) indicating the relative cost of sending data packets over the respective link. In one exemplary implementation, the larger the cost, the less likely that data packets will be routed over the link.

Values for metric fields 424 and 434 may be established by a network administer and may be configured to automatically adjust based on dynamic conditions, such as bandwidth.

Although FIG. 4 shows fields for an exemplary LSA structure 400 for implementing a point-to-multipoint-over-broadcast-or-NBMA link, in other implementations, LSA structure 400 may contain fewer, different, differently arranged, or additional fields than depicted in FIG. 4.

Exemplary Processes

Figure 5:
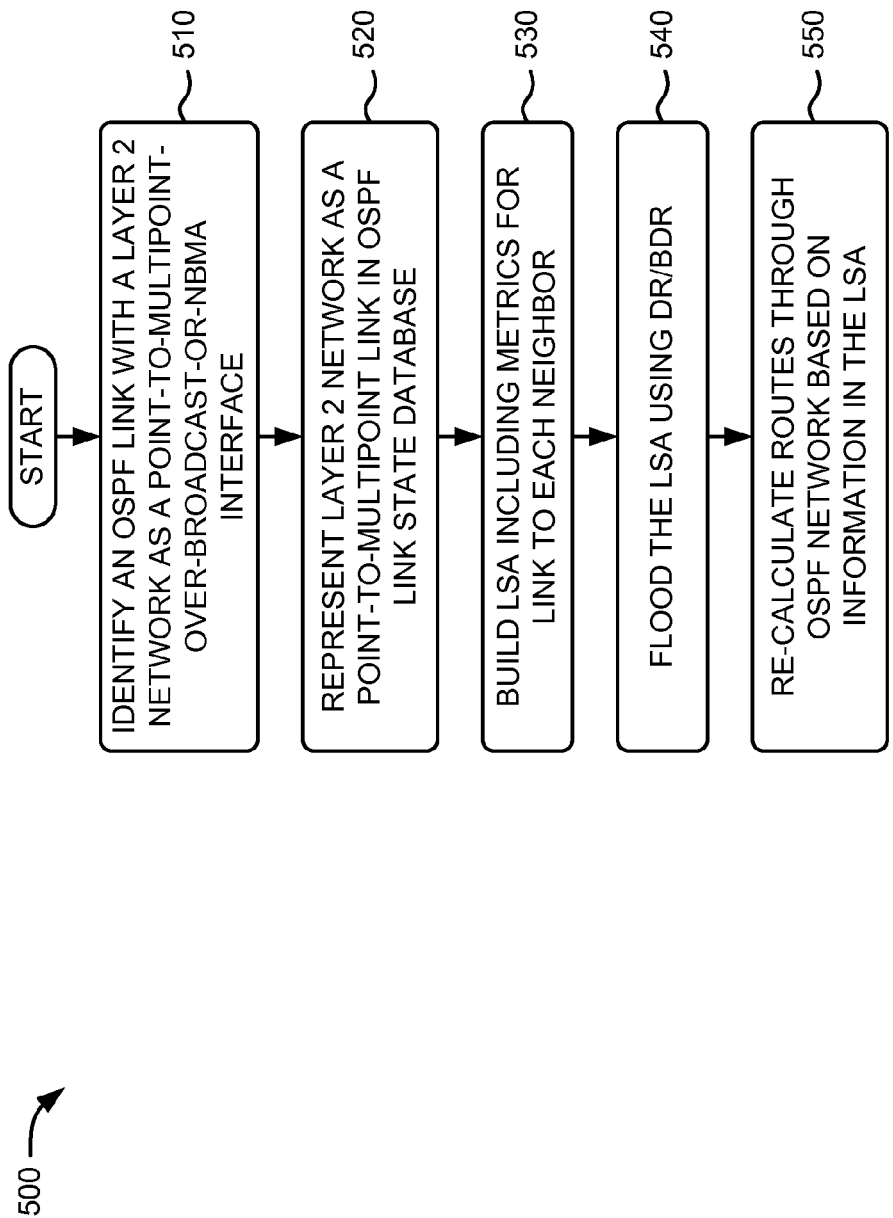
FIG. 5 illustrates a flow chart of an exemplary process for implementing a point-to-multipoint-over-broadcast-or-NBMA link according to implementations described herein.

FIG. 5 illustrates a flow chart of an exemplary process 500 for implementing a point-to-multipoint-over-broadcast-or-NBMA link according to implementations described herein. In one implementation, process 500 may be performed by one of network devices 130. In another implementation, some or all of process 500 may be performed by another device or group of devices, including or excluding one of network devices 130.

As illustrated in FIG. 5, process 500 may include identifying an OSPF link with a layer 2 network as a point-to-multipoint-over-broadcast-or-NBMA interface (block 510) and representing the layer 2 network as a point-to-multipoint link in an OSPF link-state database (block 520). For example, in implementations described above in connection with FIG. 3A, network devices 130-1, 130-2, 130-3, and 130-4 may be modeled in OSPF protocol using a P2MP-over-broadcast or P2MP-over-NBMA link. For example, a network administrator may assign a P2MP-over-broadcast or a P2MP-over-NBMA configuration via an OSPF command line interface. The P2MP-over-broadcast or P2MP-over-NBMA interface type may be interpreted by OSPF code within network devices 130 as an indication to use broadcast or NBMA network procedures for neighbor discovery and LSA flooding, but to represent the interface as P2MP in the link-state database for network 150.

An LSA may be built that includes metrics for links to each neighbor (block 530). For example, in implementations described above in connection with FIG. 4, network device 130 may provide an LSA that includes listings of multiple point-to-point links. Each link may be reported (e.g., with the appropriate numerical identifier) as a point-to-point connection to a neighboring network device. Each of "link 1" information 420 and "link 4" information 430 may include a metric field 424 and 434, respectively. Metric fields 424 and 434 may include a numerical value indicating the relative cost of sending data packets over the respective link. In one exemplary implementation, the larger the cost, the less likely that data packets will be routed over the link.

The LSA may be flooded using a DR or BDR (block 540) and routes through the area network may be re-calculated based on information in the LSA (block 550). For example, in implementations described above in connection with FIG. 3A, network devices 130 (e.g., any of network devices 130-1, 130-2, 130-3, and 130-4) may send an update (e.g., flooding an LSA) to any network devices 130 with full adjacency. In one implementation, where the sending network device (e.g., network device 130-1) is not the DR or BDR, the sending network device may send updates only to the DR and BDR. In another implementation, where the sending network device (e.g., network device 130-2) is the DR, the sending network device may send the update to multiple other network devices 130 in network 150. Use of the DR and BDR may allow network devices 130 in network 150 to maintain fewer full adjacencies, thus reducing network traffic. Network devices 130 may then use OSPF algorithms to recalculate traffic routes as the bandwidth of the network devices changes.

CONCLUSION

Systems and/or methods described herein may identify a link between a network device and a layer 2 network as a point-to-multipoint-over-broadcast-or-NBMA interface. The systems and/or methods may classify the link as a point-to-multipoint link the OSPF link-state database, and perform database synchronization and neighbor discovery and maintenance using one of a broadcast model or a NBMA model. The systems and/or methods may also generate a link-state advertisement for the network device, where the link-state advertisement includes a separate link description for each point-to-point link between the network device and multiple neighbor network devices within the layer 2 network; and send the link-state advertisement to each fully adjacent neighbor in the layer 2 network.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIG. 5, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A system comprising:
a memory to store a link-state record; and
a processor to:
identify a link between a first device and a layer 2 network;
discover a plurality of second devices within the layer 2 network,
the first device being different from the plurality of second devices;
populate the link-state record based on information associated with the plurality of second devices,
the link-state record including information classifying the link as a point-to-point link; and
advertise the first device to the plurality of second devices, the processor, when advertising the first device to the plurality of second devices, being to:
classify, in the link-state record, information designating the link between the first device and the layer 2 network as a point-to-multipoint link to form a modified link-state record,
generate a link-state advertisement for the first device based on the modified link-state record, the link-state advertisement including point-to-point link descriptions for the plurality of second devices,
the processor, when generating the link-state advertisement, being to:
determine respective metric results associated with the point-to-point link descriptions, and
include the respective metric results in the link-state advertisement, and
cause the first device to send the link-state advertisement via the link, the processor, when causing the first device to send the link-state advertisement, being to:
determine whether the first device is a designated device or a backup designated device,
a particular second device, of at least two of the plurality of second devices that are classified in the modified link-state record as being adjacent to the first device, being the designated device or the backup designated device when the first device is not the designated device or the backup designated device,
and
selectively cause:
the first device to send the link-state advertisement to each of the at least two of the plurality of second devices when the first device is the designated device or the backup designated device, or
the first device to send the link-state advertisement only to the particular second device and not to any other of the at least two of the plurality of second devices when the particular second device, and not the first device, is the designated device or the backup designated device.

2. The system of claim 1, where the processor, when populating the link-state record, is further to:
receive, from a second device of the plurality of second devices, link-state information for each point-to-point link, within the layer 2 network, that is associated with the second device, and
populate the link-state record based on the received link-state information.

3. The system of claim 1, where the respective metric results include information associated with one or more of:
a distance between the first device and one of the plurality of second devices,
a network throughput of a particular point-to-point link between the first device and the one of the plurality of second devices, or
a link availability of the particular point-to-point link.

4. The system of claim 1, where the layer 2 network is a broadcast network, and
where the processor, when discovering the plurality of second devices, is further to:
multicast discovery messages in the broadcast network, and
discover the plurality of second devices based on multicasting the discovery messages.

5. The system of claim 1, where the first device comprises one or more of:
a gateway,
a router,
a switch,
a firewall,
a network interface card (NIC),
a hub,
a bridge,
a proxy server, or
an optical add-drop multiplexer (OADM).

6. A method comprising:
identifying, by a processor, a link between a first device and a layer 2 network;
performing, by the processor, neighbor discovery to identify second devices in the layer 2 network;
storing, by the processor, information associated with the link,
the information designating the link as a point-to-point link; and
advertising, by the processor, the first device to the layer 2 network,
the advertising the first device including:
classifying, in the information, additional information designating the link, between the first device and the layer 2 network, as a point-to-multipoint link,
generating, based on the additional information, a link-state advertisement for the first device,
the link-state advertisement including respective link descriptions for point-to-point links between the first device and the second devices,
generating the link-state advertisement including:
determining respective metric results associated with the respective link descriptions; and
including the respective metric results in the link-state advertisement, and
sending the link-state advertisement using the first device,
the sending the link-state advertisement using the first device including:
determining whether the first device is a designated device or a backup designated device,
a particular second device, of at least two of the second devices that are classified as being adjacent to the first device, being the designated device or the backup designated device when the first device is not the designated device or the backup designated device, and
selectively:
sending, using the first device, the link-state advertisement to each of the at least two of second devices when the first device is the designated device or the backup designated device, or
sending, using the first device, the link-state advertisement only to the particular second device and not to any other of the at least two of second devices when the particular second device, and not the first device, is not the designated device or the backup designated device.

7. The method of claim 6, where each of the respective link descriptions include a metric value,
the metric value being based on one or more of:
a distance between the first device and an associated one of the second devices, a network throughput of one of respective point-to-point links between the first device and the associated one of the second devices, or a link availability of the one of the respective point-to-point links between the first device and the associated one of the second devices.

8. The method of claim 6, where generating the link-state advertisement further includes:

receiving link-state information for point-to-point links between the second devices, where the link-state information includes a separate link description for each of the point-to-point links between the second devices.

9. The method of claim 6, further comprising:

identifying one of the second devices as having multiple point-to-point links, in the layer 2 network, to the first device;

generating another link-state advertisement, where the other link-state advertisement includes a separate link description for each of the multiple point-to-point links between the first device and the one of the second devices; and sending the other link-state advertisement via the link.

10. The method of claim 6, where generating the link-state advertisement further includes:

including, in the link-state advertisement, respective costs associated with using the point-to-point links.

11. The method of claim 6, where performing the neighbor discovery includes:

determining that the layer 2 network is a broadcast network;

multicasting Open Shortest Path First (OSPF) discovery messages in the broadcast network; and identifying the second devices based on multicasting the OSPF discovery messages.

12. A first network device comprising:

a memory, and a processor to:

conduct neighbor discovery over an Open Shortest Path First (OSPF) link within a layer 2 network, the layer 2 network including a second network device and a third network device, the layer 2 network being a broadcast network, and the neighbor discovery identifying a plurality of OSPF point-to-point links between the first network device and the second network device, the processor, when conducting the neighbor discovery, being further to:

multicast discovery messages in the broadcast network; and conduct the neighbor discovery based on multicasting the discovery messages;

store, in the memory, information classifying the OSPF link as a point-to-point link; and advertise the first network device to the second network device and the third network device, the processor, when advertising the first network device, being further to:

classify, in the information, additional information designating the OSPF link as a point-to-multi-point link, and send, via the OSPF link, a link-state advertisement based on the additional information, the link-state advertisement including information identifying the plurality of OSPF point-to-point links and respective metrics for the plurality of OSPF point-to-point links between the first device and the second network device, the link-state advertisement being sent to the second network device and the third network device when the first network device is a designated device or a backup designated device, the link-state advertisement being sent to one of the second network device or the third network device when the first network device is not the designated device or the backup designated device, and the one of the second network device or the third network device being the designated device or the backup designated device.

13. The first network device of claim 10, where the processor is further to:

receive, from at least one of the second network device or the third network device, link-state information for the plurality of OSPF point-to-point links, and include, in the link-state advertisement, the link-state information for the plurality of OSPF point-to-point links.

14. The first network device of claim 10, where the third network device is one of a plurality of third network devices included in the layer 2 network, and where the processor, when sending the link-state advertisement, is further to:

send the link-state advertisement to the plurality of third network devices.

15. The first network device of claim 10, where the processor is further to:

determine each of the respective metrics based on one or more of:

a distance, via an associated one of the OSPF point-to-point links, between the first network device and the second network device, a network throughput of the associated one of the OSPF point-to-point links, or an availability of the associated one of the OSPF point-to-point links.

16. The first network device of claim 12, where the layer 2 network includes a plurality of devices, and the second network device and the third network device are selected from the plurality of devices based on the second network device and the third network device being classified as being adjacent to the first device after classifying the additional information designating the OSPF link as a point-to-multipoint link.

17. The system of claim 1, where, when generating the link-state advertisement, the processor is further to:

receive link-state information for each point-to-point link, where the link-state information includes a separate link description for each point-to-point link.

18. The system of claim 1, where the processor, when generating the link-state advertisement, is further to:

receive link-state information for point-to-point links between the plurality of second devices, where the link-state information includes a separate link description for each of the point-to-point links between the plurality of second devices.

19. The system of claim 1, where the processor, when generating the link-state advertisement, is further to:

include, in the link-state advertisement, respective costs associated with using the point-to-point link.

20. The method of claim 6, further comprising:
receiving, from a second device of the second devices, link-state information for each point-to-point link that is associated with the second device; and
storing the received link-state information for each point-to-point link that is associated with the second device with the information associated with the link.

* * * * *